(12) United States Patent
Matsuda

(10) Patent No.: US 6,198,547 B1
(45) Date of Patent: Mar. 6, 2001

(54) APPARATUS FOR READING AN IMAGE AND METHOD OF EXTRACTING AN IMAGE

(75) Inventor: Shinya Matsuda, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/039,838

(22) Filed: Mar. 16, 1998

(30) Foreign Application Priority Data

Mar. 18, 1997 (JP) .................................................. 9-064360

(51) Int. Cl.$^7$ ........................................................ H04N 1/04
(52) U.S. Cl. ................................................ 358/474; 358/473
(58) Field of Search ................................... 358/474, 497, 358/488, 494, 493, 475, 473; 382/312

(56) References Cited

U.S. PATENT DOCUMENTS

| 4,987,499 | * | 1/1991 | Kimura | 358/474 |
| 5,084,611 | | 1/1992 | Okisu et al. | 250/208.1 |
| 5,124,915 | * | 6/1992 | Krenzel | 364/420 |
| 5,416,609 | | 5/1995 | Matsuda et al. | 358/474 |
| 5,705,806 | * | 1/1998 | Matsuda et al. | 358/512 |
| 5,726,775 | * | 3/1998 | Walsh | 358/488 |
| 5,886,342 | * | 3/1999 | Matsui | 358/474 |
| 5,953,104 | * | 9/1999 | Matsumoto | 355/40 |

FOREIGN PATENT DOCUMENTS 7-087295    3/1995   (JP) .

* cited by examiner

Primary Examiner—Jerome Grant II
(74) Attorney, Agent, or Firm—Sidley & Austin

(57) ABSTRACT

An apparatus for reading an image of the obverse side of a thin sheet includes a light source for emitting a light for illuminating the obverse side of the thin sheet. The light contains two fractions having different wave lengths from each other. When the light has been reflected on the thin sheet, first and second image pickup means receive one and the other of the aforesaid two fractions respectively. In order to be free of the adverse effect of characters, etc. printed on the reverse side of the thin sheet and seen therethrough on the obverse side, an signal processing system is operable such that image information on the obverse side of the thin sheet alone is extracted from image data outputted from the first and second image pickup means respectively.

11 Claims, 6 Drawing Sheets

APPARATUS FOR READING AN IMAGE AND METHOD OF EXTRACTING AN IMAGE

BACKGROUND OF THE INVENTION

This application is based on Japanese Patent Application No. 09-064360 filed on Mar. 18, 1997, the contents of which are incorporated herein by reference.

1. Field of the invention

This invention relates to an apparatus for reading an image, and has particular reference to an apparatus capable of reproducing the obverse side of paper such that a copy taken is free of the adverse effect of characters, etc. printed on the reverse side of the paper and seen therethrough.

2. Description of the prior art

Books and magazines commonly in print consist of leaves, each of which has characters and/or charts printed on both sides of each leaf. In a known apparatus of the kind indicated above, it has been found that, when a book or magazine consists of thin leaves, the apparatus reads not only characters, etc. printed on the obverse side of a leaf but also characters, etc. printed on the reverse side of the leaf and seen therethrough. This will inevitably cause an impairment of picture quality.

Two methods of image information processing have been previously proposed to reduce the effects of characters, etc. printed on the reverse side of thin paper. One of these two methods is described in Japanese Laid Open Patent Application No. 7-87295, which discloses a copying machine adapted to copy both sides of an original. In this prior art method, a specific picture element contained in an image of the obverse side of the original is regarded as representing a portion of an image of characters, etc. printed on the reverse side of the original if (1) the photographic density of the specific picture element is less than a prescribed value and (2) if the photographic density of a picture element contained in an image of the reverse side of the original and corresponding to the specific picture element is greater than another prescribed value. The other of the two methods involves preparing a histogram for the distribution of the luminances of picture elements. For the purpose of correction, the luminances of picture elements read from the upper surface are calculated from the shape of the histogram.

A drawback of the first of the two methods is that this method can be implemented only in a copying machine adapted to copy both sides of an original. On the case of a copying machine in which an original has to be laid prone on an original glass plate and a copy of only one side of the original can be taken at one time, it is difficult to ensure the correct mating of the position of the original after turning-up with that before turning-up. Especially when one double-page spread after another of a book or magazine is an object to be read, difficulty is encountered all the more because, every time a leaf is to be turned over, the book or magazine has to be turned-up and positional again to lie prone on the original glass plate. In the case of a book scanner wherein a book or magazine is mounted on a baseboard so as to lie face up, difficulty is likewise encountered because, every time a leaf has been turned over, the positional relationship between the characters, etc. and the baseboard changes. Furthermore, the first of the two methods requires two image memories for storing data read from both sides of paper respectively. Obviously, this requirement has imposed a serious economic disadvantage to the first of the two methods.

With the second of the two methods, it has been found that a lightly printed or written image or photograph such as characters, etc. written in pencil or in cinnabar is frequently confused with that darkly printed or written on the reverse side of thin paper and is erased by mistake.

SUMMARY OF THE INVENTION

A principal object of this invention is to provide an apparatus of the kind indicated above, which eliminates the necessity of providing two image memories and which does not read characters, etc. printed on the reverse side of a thin leaf and seen therethrough.

In order to be free of the image of characters, etc. printed on the reverse side of a thin leaf and seen therethrough, this invention takes advantage of the fact that the reflection characteristics of a light incident on a manuscript or the like depend on the wave length.

DETAILED DESCRIPTION

Figure 1:
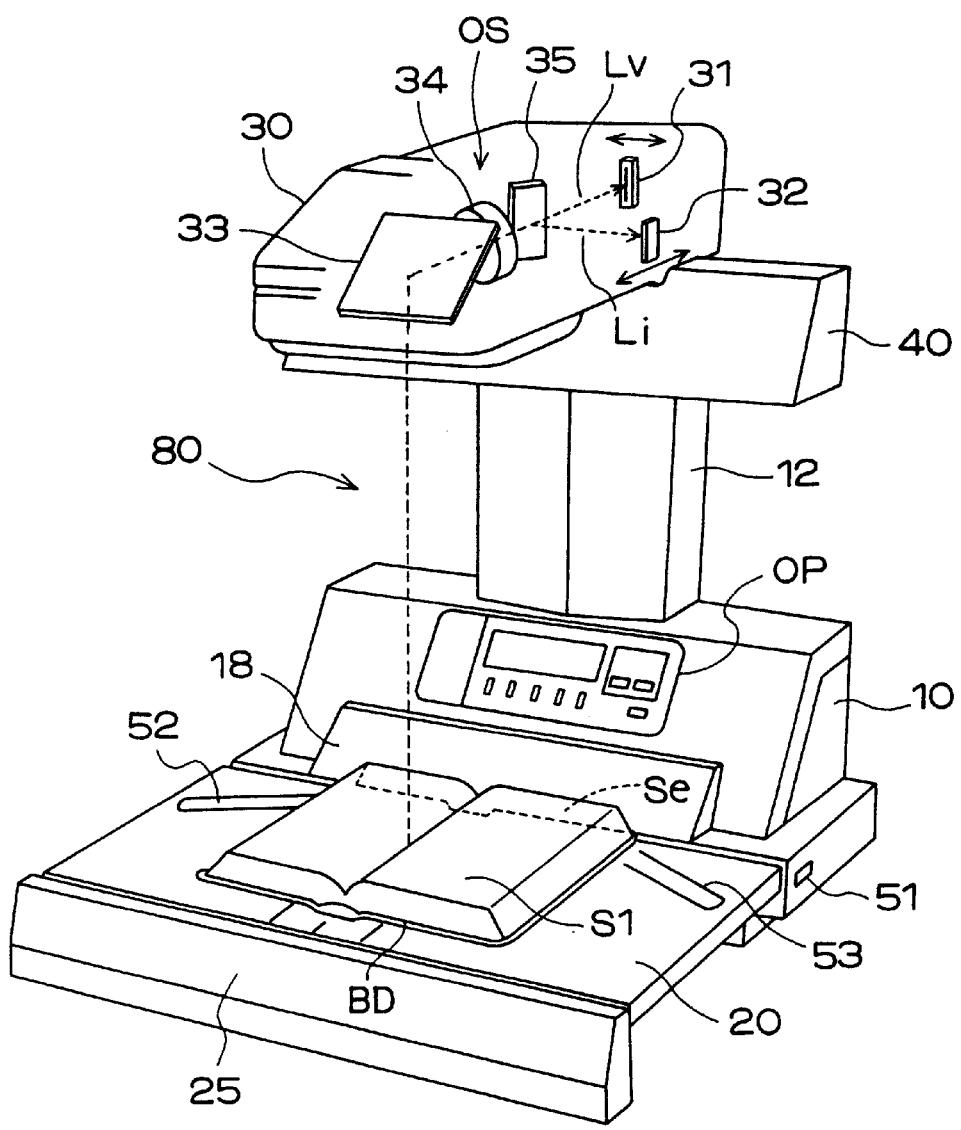
FIG. 1 is a perspective view illustrating the appearance of a book scanner embodying this invention.

Referring now to FIG. 1, a book scanner 1 embodying this invention will be found advantageous when used in reading one double-page spread after another of a book BD. The book scanner 1 comprises a housing 10 within which an electrical circuit is disposed, a supporting member 12 extending upwardly from the upper surface of the housing 10, a baseboard 20 projecting forwardly from the housing 10 such that an object to be read is mounted thereon so as to lie face up, an image pickup unit 30 supported by the supporting member 12 so as to overhang the baseboard 20 and adapted to convert an image into electric signals, and a lamp unit 40 mounted on the underside of the image pickup unit 30 at the rearward end of the lamp unit 40 and adapted to illuminate the object by means of radiation emitted by a tungsten halogen lamp with a wave length of 400 to several thousands of nanometers falling within the visible and infrared regions. There is a relatively greater amount of space 80 between the baseboard 20 and the image pickup unit 30 so as to facilitate the work of turning over the leaves of the book BD on the baseboard 20.

A control panel OP having a liquid crystal display is mounted on the front wall of the housing 10 in the upper end portion of the housing 10. A profile projector 18 for measuring the height of page S1 at which the book BD is opened is mounted on the front wall of the housing 10 in the lower end portion of the housing 10. The end face Se of the book BD is reflected in the profile projector 18 and is photographed together with characters, etc. printed on page S1. The height of page S1 is calculated from the shape of the photographed end face Se.

The housing 10 is provided on its flank with a main switch 51. Start keys 52 and 53 are spaced apart transversely to the baseboard 20 on the upper surface thereof. An arm rest 25 is mounted on the front edge of the baseboard 20.

Figure 2:
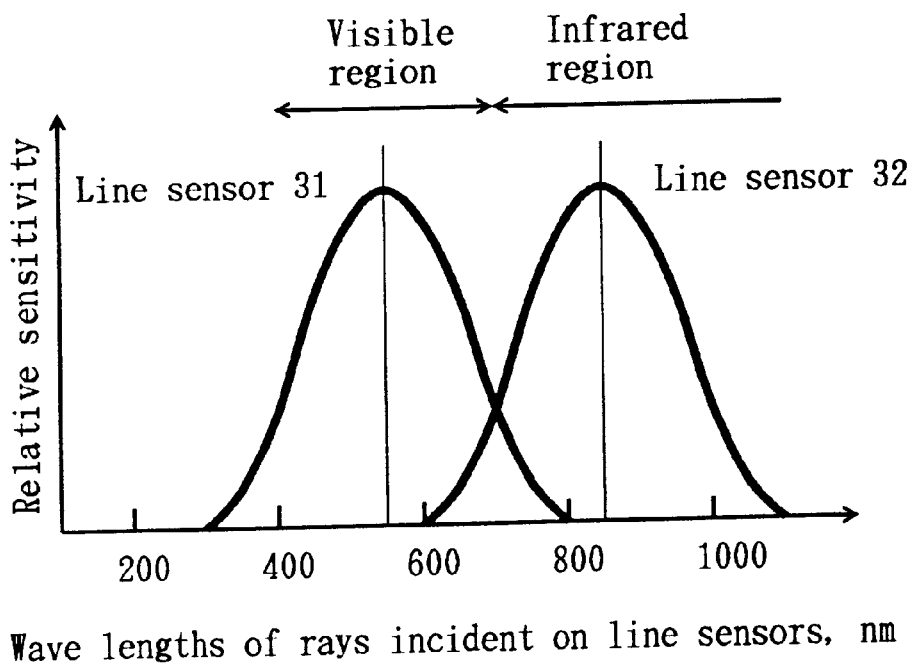
FIG. 2 shows the spectral sensitivity characteristics of line sensors.

The image pickup unit 30 includes line sensors 31 and 32 consisting of CCD arrays and having an identical photoelectric transfer characteristic. The image pickup unit 30 further includes an optical system OS consisting of a mirror 33, image-forming lens 34, and filter mirror 35. By virtue of the optical system OS, characters, etc. printed on page S1 are allowed to cast their reflections on the light-receiving surfaces of the line sensors 31 and 32. The distribution of spectral sensitivity characteristics of the line sensors 31 and 32 is normal if the light beam reflected back thereto has a wave length ranging substantially from 400 to 1,000 nm. The image-forming lens 34 can be moved forwardly and rearwardly to a new position determined by an automatic focusing mechanism (not shown). The line sensors 31 and 32 are mounted on the moving parts of auxiliary scanning mechanisms (not shown) so as to be horizontally displaceable. Main scanning is carried out in forward and rearward directions on the upper surface of the baseboard 20. These directions correspond to the upward and downward directions respectively on the image pickup surfaces of the line sensors 31 and 32. Area sensors may be used in place of the line sensors 31 and 32. After passage through the image-forming lens 34, the radiation is divided by the filter mirror 35 into two fractions. Infrared rays are reflected on the surface of the filter mirror 35 and directed to the line sensor 32 as infrared rays Li. Visible rays with wave lengths less than about 650 nm are allowed to pass through the filter mirror 35 and directed to the line sensor 31 as visible rays Lv. Properly selected characteristics of the line sensor 31 and the filter mirror 35 will permit the spectral sensitivity characteristic of the line sensor 31 to approximate the human visual sensitivity, with wave lengths centering around 550 nm as shown in FIG. 2. The spectral sensitivity characteristic of the line sensor 32 is represented by wave lengths centering around 850 nm.

In one instance of use of this invention, the book BD is allowed to lie face up on the baseboard 20 in such a manner that a border line between two pages constituting the double-page spread S1 is brought into line with a center mark put on the upper surface of the baseboard 20 medially of the flanks of the baseboard 20 and that the upper edges of the front and back covers of the book BD engage the lower edge of the profile projector 18.

Figure 3:
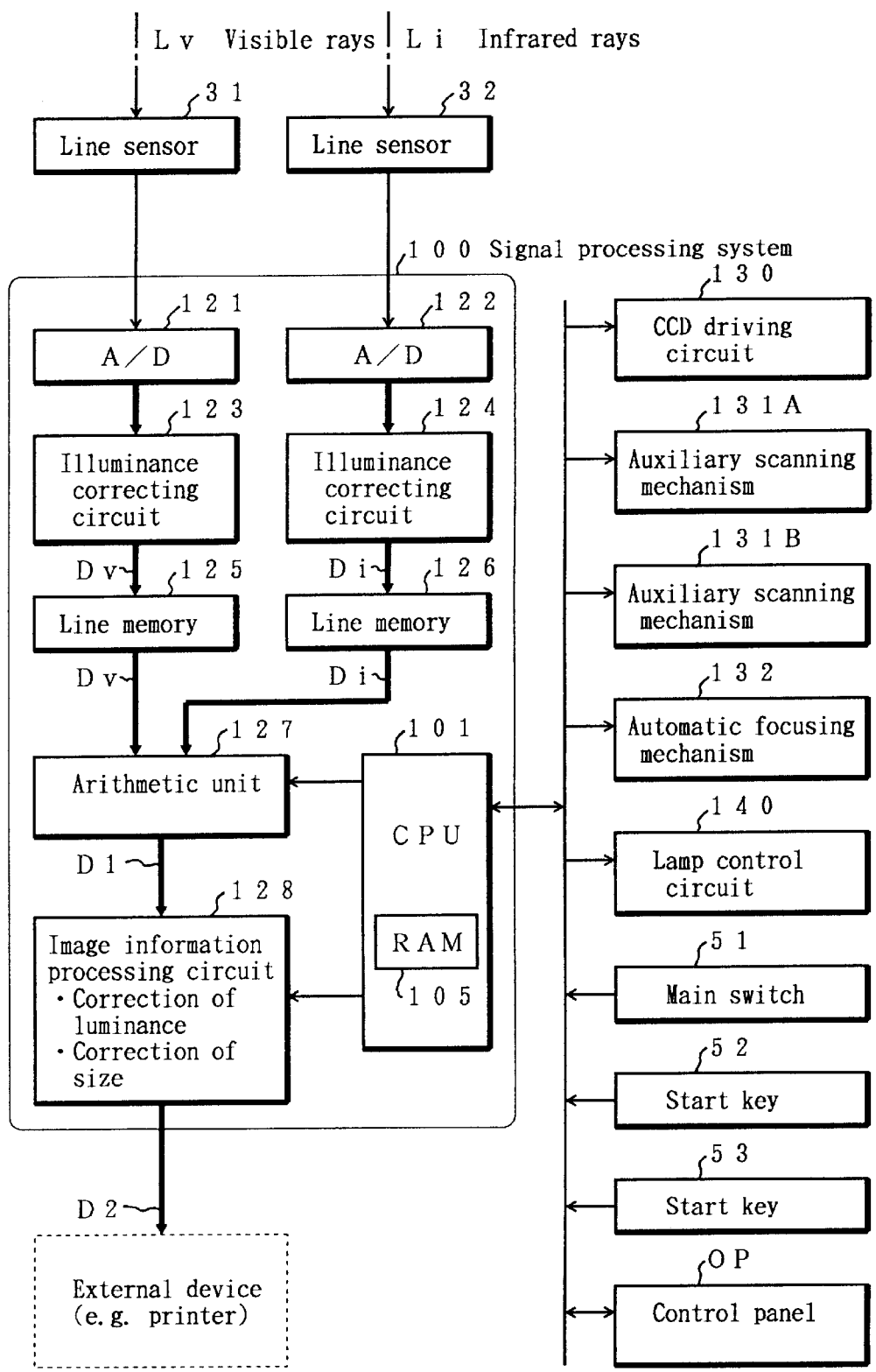
FIG. 3 is a block diagrammatic representation of the book scanner.

Referring now to FIG. 3, a block diagrammatic representation of the book scanner 1 is shown. A CPU 101 incorporating a microcomputer effects control over the book scanner 1 and carries out data processing for measuring the height of page S1 and the luminance of the white ground of page S1. A RAM 105 is provided as a work area for a program to be executed by the CPU 101. A CCD driving circuit 130 for supplying clock pulses to the line sensors 31 and 32, auxiliary scanning mechanisms 131A and 131B for displacing the line sensors 31 and 32 respectively in horizontal directions, an automatic focusing mechanism 132 for moving the image-forming lens 34, and a lamp control circuit 140 for effecting on-off control over the lamp unit 40 are connected to the CPU 101, in addition to the main switch 51, start keys 52 and 53, and control panel OP.

The book scanner 1 includes a signal processing system 100 comprising A/D converters 121 and 122, illuminance correcting circuits 123 and 124, line memories 125 and 126, arithmetic unit 127 and image information processing circuit 128. A photoelectric transfer signal outputted from the line sensor 31 is converted by the A/D converter 121 into, e.g., an 8-bit image data, which is subjected to shading correction in the illuminance correcting circuit 123. An image data Dv outputted from the illuminance correcting circuit 123 is temporarily stored in the line memory 125 having a capacity of storing data from a line. A photoelectric transfer signal outputted from the line sensor 32 is quantized by the A/D converter 122, from which the signal is transmitted to the illuminance correcting circuit 124 and then to the line memory 126 for being temporarily stored in the line memory 126. The line memories 125 and 126 serve as data buffers that hold data being transferred from the illuminance correcting circuits 123 and 124 to the arithmetic unit 127.

The arithmetic unit 127 performs arithmetic operations as will appear hereinafter on the basis of image data Dv and Di outputted from the line memories 125 and 126 respectively and produces an image data D1 free of characters, etc. printed on the reverse side of the leaf. The image data D1 is fed to the image information processing circuit 128, in which luminance is corrected so that the image may be reproduced with a designated photographic density. Size is also corrected in accordance with paper size or designated expansion ratio. The distortion of the image caused by the curved portions of leaves in the immediate vicinity of the border line between two pages constituting the double-page spread S1 is also corrected by variable power. An image data D2 outputted from the image information processing circuit 128 is fed to an external device such as a printer, display, image memory or image editing device.

Figure 4:
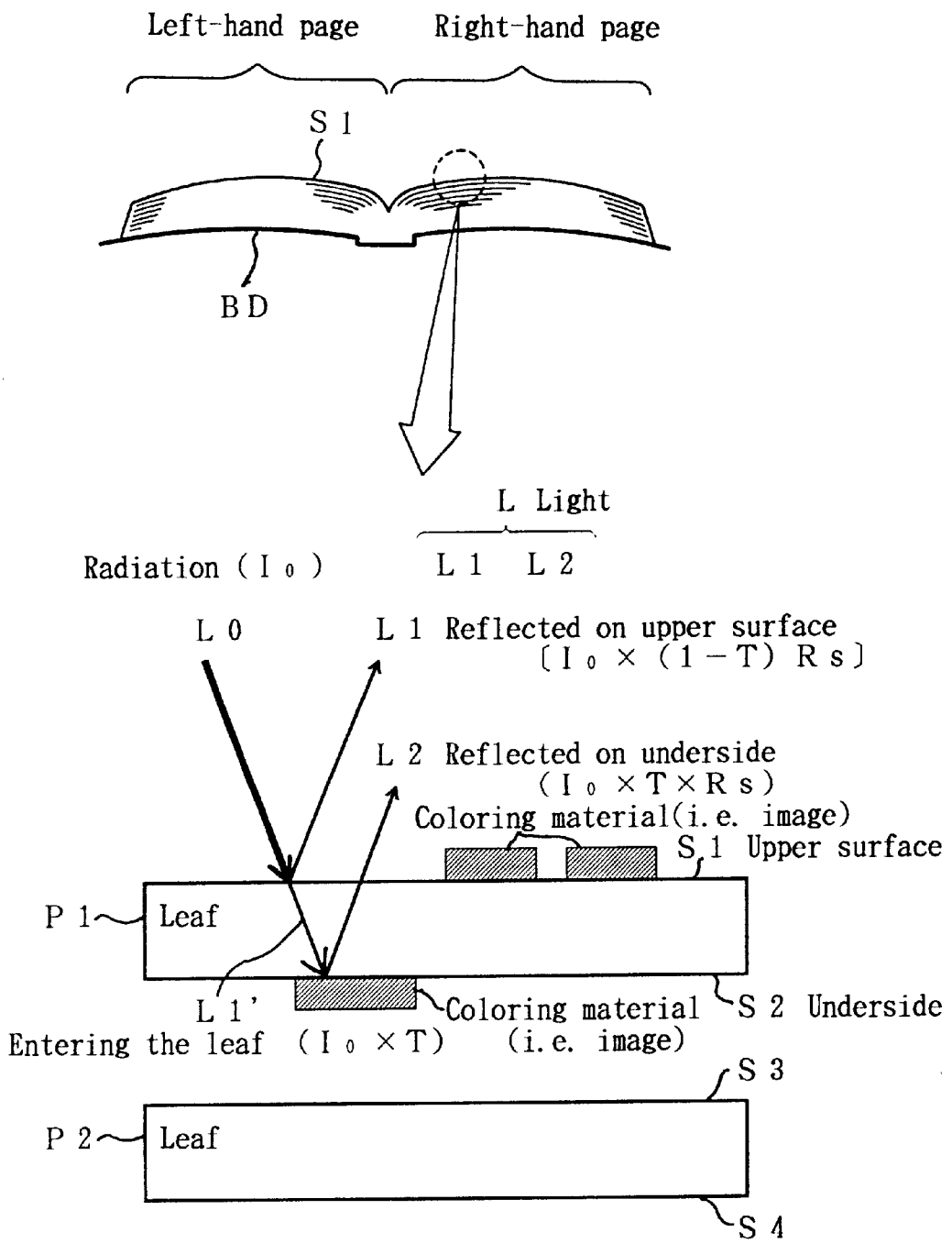
FIG. 4 is a schematic representation to help explain how a known apparatus reads an image printed on the reverse side of a leaf.

The function of the arithmetic unit 127 will now be explained in connection with FIG. 4, in which the uppermost leaf of the book BD on the baseboard 20 is designated as P1, while the second leaf from the top is designated as P2. However, the following description is applicable also to a single sheet of paper. The upper surface of the leaf P1 is designated as S1, while the underside of the leaf P1 is designated as S2.

Calculation of Reflectivity

Specific reference is now made to how the radiation L0 emitted by the lamp unit 40 is reflected on the surfaces of the leaf P1. As is known, the quantity I' of light reflected on the surface of an object is Proportional to the reflectivity R as shown by the formula:

$$I'=I_0 \cdot R \tag{1}$$

where $I_0$ is the quantity of radiation emitted by a light source. On the other hand, the reflectivity R is given by $$R=\frac{1}{10}^D \tag{2}$$

where D is the photographic density of characters, etc. printed on the surface of the object.

When the book BD is irradiated by the radiation L0, a major portion L1 of the radiation L0 is reflected on the upper surface S1 of the leaf P1, while the remainder L1' of the radiation L0 enters the leaf P1 and is either reflected on a coloring material attached to the underside S2 of the leaf P1 as a result of printing characters, etc. thereon or reflected on the upper surface S3 of the leaf P2. The reflected light beam from the coloring material is designated as L2. This phenomenon presents itself irrespective as to whether or not there are characters, etc. printed on the upper surface S1 of the leaf P1, and an adverse effect on the picture quality results from the reflected light beam L2.

From the foregoing, it will be apparent that a light L incident on the line sensors 31 and 32 is the sum of the reflected light beams L1 and L2. Therefore, the quantity I' of the light L is given by $$I'=I_0 \cdot (1-T) \cdot Rs + I_0 \cdot T \cdot Rb \tag{3}$$

where Rs=reflectivity on the upper surface S1

Rb=reflectivity on the underside S2

T=transmittance by the leaf P1

Ordinarily, a book consists of porous leaves, the surfaces of which are microscopically uneven to the extent of scattering the radiation L0. The ratio of scattered light to the incident light is inversely proportional to the biquadrate of the wave length. Consequently, the quantity of infrared rays scattered on the upper surface S1 of the leaf P1 is smaller than the quantity of visible rays scattered thereon, because the wave lengths of infrared rays are greater than those of visible rays. This means that the quantity of infrared rays entering the leaf P1 is greater than the quantity of visible rays entering the leaf P1. Consequently, the quantity Iv' of visible rays incident on the line sensor 31 differs from the quantity Ii' of infrared rays incident on the line sensor 32. The quantities Iv' and Ii' are given by $$Iv'=I_0 \cdot (1-Tv) \cdot Rs + I_0 \cdot Tv \cdot Rb \quad (4)$$

$$Ii'=I_0 \cdot (1-Ti) \cdot Rs + I_0 \cdot Ti \cdot Rb \quad (5)$$

where Tv=transmittance of visible rays

Ti=transmittance of infrared rays

Accordingly, general expressions for finding the reflectivities Rv and Ri of visible and infrared rays on the upper surface S1 may be derived from equations (4) and (5) respectively as:

$$Rv=Iv'/I_0=(1-Tv) \cdot Rs + Tv \cdot Rb \quad (6)$$

$$Ri=Iv'/I_0=(1-Ti) \cdot Rs + Ti \cdot Rb \quad (7)$$

Extraction of Characters, etc. Printed on the Upper Surface S1

As stated above, a scattering loss is inversely proportional to the biquadrate of a wave length. This means that the ratio α of the transmittance Ti of infrared rays to the transmittance Tv of visible rays is equal to the biquadrate of the ratio of the wave length λi of infrared rays to the wave length λv of visible rays as shown by the formula a:

$$\alpha = Ti/Tv = (\lambda i/\lambda v)^4 \quad (8)$$

As will be appreciated, the most favorable result will of course be obtained from arithmetic operations performed on the basis of the actual distribution of wave lengths found at the time of image formation. For the sake of simplicity, however, 550 and 850 nm, around which the wave lengths representing the spectral sensitivity characteristics of the line sensors 31 and 32 respectively are assumed to be centering in this embodiment, are used for calculating the ratio α. Then, we obtain $$\alpha = (850/550)^4 \approx 5.7$$

Putting equation (8) into equation (7), we have $$Ri=(1-Ti) \cdot Rs + Ti \cdot Rb$$

$$=(1-\alpha Tv) \cdot Rs + \alpha Tv \cdot Rb \quad (9)$$

Reflectivity Rs on the characters, etc. printed on the upper surface S1 is found from simultaneous equations (6) and (9) as follows:

$$\alpha Rv = \alpha(1-Tv) \cdot Rs + \alpha \cdot Tv \cdot Rb \quad (10)$$

-continued $$\alpha Rv - Ri = \alpha(1-Tv) \cdot Rs + \alpha \cdot Tv \cdot Rb - (1-\alpha \cdot Tv) \cdot Rs - \alpha \cdot Tv \cdot Rb$$

$$= (\alpha - 1) \cdot Rs$$

$$\therefore Rs = (\alpha \cdot Rv - Ri)/(\alpha - 1)$$

This reflectivity Rs is multiplied by the quantity $I_0$ of radiation L0. Image data obtained from this multiplication do not contain image information on the characters, etc. printed on the underside S2 but contain image information on those printed on the upper surface S1 alone, as shown by the formula:

$$I_o \cdot Rs = I_o \cdot (\alpha \cdot Rv - Ri)/(\alpha - 1) \quad (11)$$

$$= (\alpha Iv' - Ii')/(\alpha - 1)$$

The arithmetic unit 127 fetches image data Dv and Di on an identical picture element from the line memories 125 and 126 respectively. The values of the ratio α and the quantity $I_0$, which are stored beforehand, are applied to equation (11), and the image data D1 on the characters, etc. printed on the upper surface S1 are calculated. The image data Dv represents the quantity Iv' of visible rays incident on the line sensor 31, while the image data Di represents the quantity Ii' of infrared rays incident on the line sensor 32. These arithmetic operations are performed in order of picture elements provided on the surfaces of the line sensors 31 and 32. The image data D1 free of characters, etc. printed on the underside S2 is fed to the image information processing circuit 128.

Figure 5:
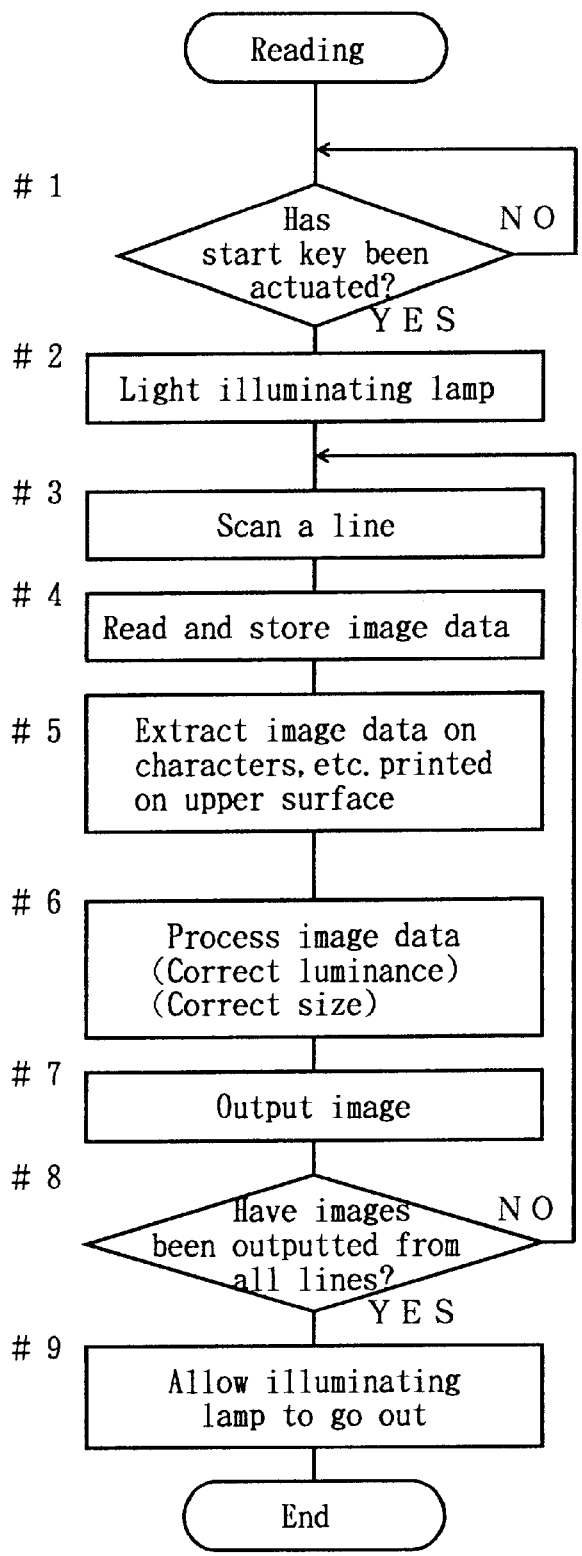
FIG. 5 is a flow diagram representing successive steps in a typical operation of the book scanner.

For a more complete understanding of the successive steps in a typical operation of the book scanner 1, reference FIG. 5.

An illuminating lamp is lighted when the start key 52 or 53 is actuated. Scanning is commenced with the line sensors 31 and 32 moved in horizontal directions (steps 1 to 3). Every time a line has been scanned, image data Dv and Di are temporarily stored in the line memories 125 and 126 respectively. Then, image data on the characters, etc. printed on the upper surface S1 are extracted, subjected to image information processing, and fed to an external device (steps 4 to 7). When images have been outputted from all lines, the illuminating lamp is allowed to go out so as to provide standby conditions (steps 8 and 9).

As has been above explained, an objectionable feature of the prior art method is that, even when a copy of only the upper surface S1 is desired, both sides of the leaf P1 have to be scanned and two image memories have to be provided for storing data read from both sides of the leaf P1 respectively. By contrast, an important facet of the invention is that the underside S2 need not be scanned when a copy of only the upper surface S1 is desired, because the image of characters, etc. printed on the underside S2 are erased from image information obtained from the upper surface S1. This important facet of the invention obviates the necessity of providing two image memories and thereby serves to make the apparatus compact and relatively inexpensive in cost.

Figure 6:
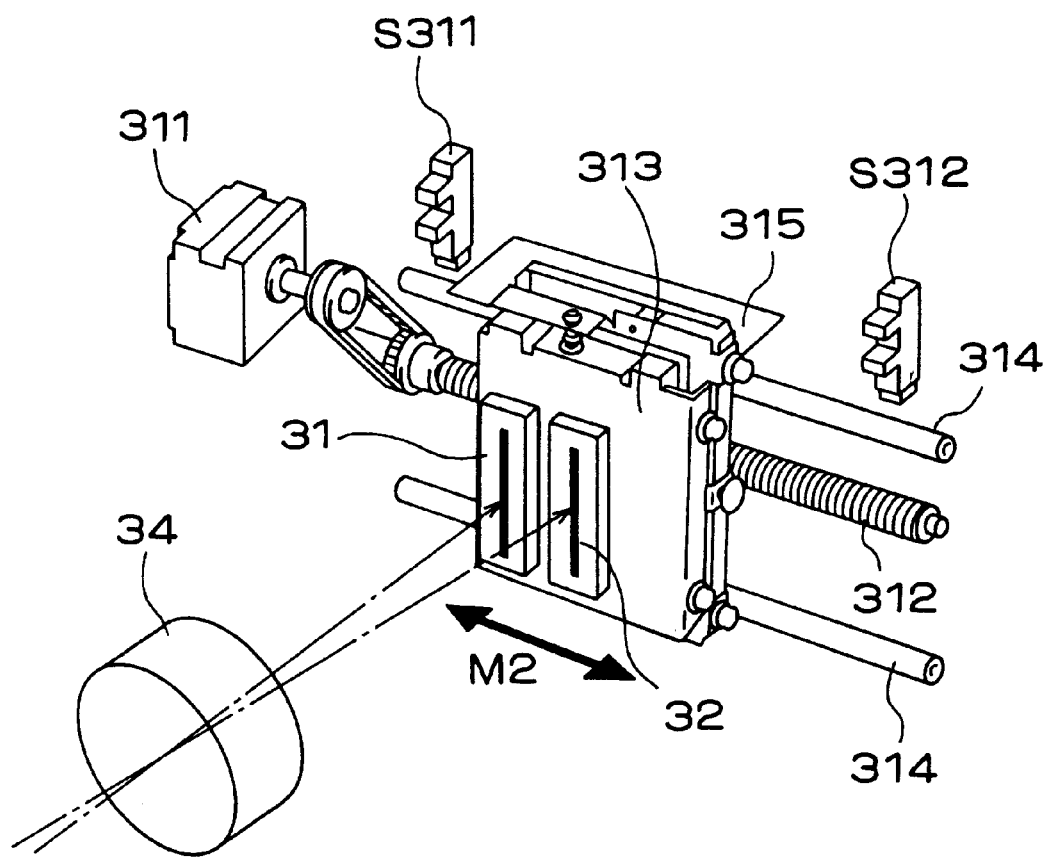
FIG. 6 is a view showing the component parts of an auxiliary scanning mechanism incorporated in a second preferred embodiment of the inventive apparatus.

Referring now to FIG. 6, an auxiliary scanning mechanism 131 is shown and differs from that of FIG. 1 by the fact that the line sensors 31 and 32 are provided side by side on a single scanner 313. The light beams are incident on the line sensors 31 and 32 after passage through the image-forming lens 34. An interference filter located in front of the line sensor 31 passes only visible rays through to the line sensor 31. Another interference filter located in front of the line sensor 32 passes only infrared rays through to the line sensor 32. These two filters obviate the necessity of providing the filter mirror 35. To cause the desired horizontal displacement in directions M2, the scanner 313 is carried by an adjustment control rod 312 having at one end a driven pulley that is connected by a belt to a driving pulley carried by a shaft from a motor 311. The auxiliary scanning mechanism 131 further includes a pair of guide rails 314 for horizontal guiding of the scanner 313. Photointerrupters S311 and S312 for detecting the position of the scanner 313 are provided one at each end of the path of travel of the scanner 313 so as to cooperate with a douser 315 provided on the scanner 313. Since the line sensors 31 and 32 are carried along in the horizontal movement of the scanner 313, an instant when a reflected light beam from a portion of the object is incident on the line sensor 31 differs from an instant when a reflected light beam from the same portion of the object is incident on the line sensor 32. In order to compensate for such time difference established between the line sensors 31 and 32, the line memory for the line sensor 31, which is exposed to the reflected light beam earlier than the line sensor 32, should be a buffer that holds data for such a length of time as to be required for storing data on n lines. The value of n is determined by a period of image formation and a space between two line sensors. By virtue of this buffer, image data obtained by the line sensors 31 and 32 from the same portion of the object can be fed to the arithmetic unit 127 at a time.

This invention may of course be applied also to an apparatus in which an original has to be laid prone on an original glass plate.

What is claimed is:

1. An apparatus for reading an image, comprising:
    a first image pickup device for receiving a first light fraction contained in incident light from an object, the incident light including at least the first light fraction and a second light fraction;
    a second image pickup device for receiving the second light fraction, the second light fraction having a different wave length than the first light fraction; and
    a signal processing system for extracting image data representative of an image of said object from output data obtained from said first image pickup device and said second image pickup device by visually excluding image data, corresponding to an output data contribution obtained from one of said first image pickup device and said second image pickup device, from image data corresponding to an output data contribution obtained from the other of said first image pickup device and said second image pickup device.

2. An apparatus as defined in claim 1, wherein said first image pickup device and said second image pickup device receive infrared light rays and visible light rays, respectively.

3. An apparatus as defined in claim 1, wherein said signal processing system for extracting image data is operable such that, when reproducing an obverse side of a thin sheet, image data appearing on a reverse side of said thin sheet and seen therethrough on said obverse side are excluded.

4. An apparatus as defined in claim 1, further comprising a baseboard to receive an object to be read, said baseboard being located below said first image pickup device and said second image pickup device so as to allow said object to be scanned from above.

5. An apparatus for reading an image, comprising:
    a light source for emitting a light for illuminating an object, said light comprising a first light fraction and a second light fraction having different wave lengths from each other;
    an optical device for dividing said light into said first light fraction and said second light fraction when said light has been reflected on a surface of said object and received by said optical device;
    a first image pickup device for receiving said first light fraction;
    a second image pickup device for receiving said second light fraction; and
    a signal processing system for extracting image data from said surface of said object from output data obtained from said first image pickup device and said second image pickup device,
    wherein the signal processing system effects a visual exclusion of certain image data that corresponds to output data obtained from one of said first image pickup device and said second image pickup device from image data that corresponds to output data obtained from the other of said first image pickup device and said second image pickup device.

6. An apparatus as defined in claim 5, wherein said first image pickup device and said second image pickup device receive infrared light rays and visible light rays, respectively.

7. An apparatus as defined in claim 6, wherein said optical device consists of an optical filter which reflects infrared light rays on a surface thereof and allows visible light rays to pass therethrough.

8. An apparatus as defined in claim 5, further comprising a baseboard to receive an object to be read, said baseboard being located below said first image pickup device and said second image pickup device so as to allow said object to be scanned from above.

9. An apparatus for reading an image, comprising:
    a light source for emitting a light for illuminating an object, said light containing two light fractions having different wave lengths;
    an optical device for dividing said light into a first light fraction and a second light fraction when said light has been reflected on a surface of said object and received by said optical device;
    a first image pickup device for receiving said first light fraction;
    a second image pickup device for receiving said second light fraction; and
    a signal processing system operable such that, in reproducing an obverse side of a thin sheet, image data appearing on a reverse side of said thin sheet and seen therethrough on said obverse side are excluded on the basis of output data obtained from said first image pickup device and said second image pickup device.

10. A method of extracting an image, comprising the steps of:
    emitting a light for illuminating a thin sheet, said light containing two light fractions having different wave lengths from each other;
    dividing said light, reflected from said thin sheet, into a first light fraction and a second light fraction;
    obtaining first image pickup data from said first light fraction;
    obtaining second image pickup data from said second light fraction; and
    extracting image data on the basis of an obverse side of said thin sheet by excluding image data appearing on a reverse side of said thin sheet and seen therethrough on said obverse side, on the basis of said first image pickup data and said second image pickup data.

11. An apparatus for reading an image of an object, the apparatus comprising:

a light source for emitting light including a first light fraction and a second light fraction, wherein the first light fraction is selected so as to be mainly reflected by an obverse side of the object, and the second light fraction is selected so as to be mainly reflected by an reverse side of the object and partly reflected by the obverse side of the object;

a first image pickup device for receiving a reflected first light fraction and for outputting first data;

a second image pickup device for receiving a reflected second light fraction and for outputting second data; and a signal processing device for producing image data from the first data and the second data that corresponds to an image shown on the obverse side of the object in accordance with reflectivity and transmittance characteristics of each of the reflected first light fraction and the reflected second light fraction.

* * * * *